United States Patent [19]
Aida

[11] 4,156,474
[45] May 29, 1979

[54] TRANSMISSION REMOTE CONTROL ASSEMBLY OF A TILT-CAB

[75] Inventor: Kazunori Aida, Urawa, Japan

[73] Assignee: Nissan Diesel Motor Co., Ltd., Saitama, Japan

[21] Appl. No.: 846,150

[22] Filed: Oct. 27, 1977

[30] Foreign Application Priority Data

Oct. 30, 1976 [JP] Japan ............... 51/145310[U]

[51] Int. Cl.² ............................................ G05G 9/16
[52] U.S. Cl. ........................ 180/77 TC; 74/473 R; 180/89.14
[58] Field of Search ............. 74/473 R; 180/77 TC, 180/89.14

[56] References Cited

FOREIGN PATENT DOCUMENTS

2037310 4/1971 Fed. Rep. of Germany ........ 180/89.14
2264121 7/1973 Fed. Rep. of Germany ........ 74/473 R

Primary Examiner—Allan D. Herrmann

[57] ABSTRACT

In a transmission remote control assembly of a tilt-cab type vehicle a first link mechanism connected to a change lever, a second link mechanism connected to a transmission lever or levers and at least one connecting means comprising a pair of connecting members respectively connected to the first and second mechanisms are so arranged that when a cab body is in a horizontal stationary state, the pair of connecting members are in connecting engagement whereby the change and transmission levers may co-operate whereas when the cab body undergoes inclining movement, the pair of connecting members are disengaged so as to disconnect the first and second link mechanisms.

7 Claims, 9 Drawing Figures

TRANSMISSION REMOTE CONTROL ASSEMBLY OF A TILT-CAB

FIELD OF THE INVENTION

The present invention relates to a transmission remote control assembly of a tilt-cab type vehicle having a cab body pivotably supported at the front end of a frame assembly by means of a tilt hinge, the remote control assembly being capable of transmitting operation of a change lever by a driver in the cab body to transmission levers.

BACKGROUND OF THE INVENTION

In a tilt-cab type vehicle, the change lever is generally carried on the side of either the cab body or frame assembly. If the change lever is carried by the frame assembly, it is necessary to provide a cab floor having an opening sufficient to avoid any interference between the change lever and the cab floor which may occur when the cab body is allowed to incline. Furthermore, measures should be taken to reinforce the floor or to reduce sound, heat or dust coming through the opening in order to prevent the driver's environment in the cabin from being adversely affected. For these reasons, it is generally advantageous in tilt-cab type vehicles to dispose the change lever in the cab body.

When the change lever of a transmission remote control assembly is carried by the cab body, a link mechanism of the control assembly should be arranged so that it does not hinder inclining movement of the cab body. In order to meet this requirement, the link mechanism is generally so arranged that the center of movement of the link mechanism may lie in the vicinity of the center of inclining movement of the cab body. With such an arrangement, however, a force applied to the change lever is passed around forward to the vicinity of the center of inclining movement of the cab body and then transmitted backward to the transmission lever or levers. This results not only in a reduced transmission efficiency of force due to clearances between links and friction forces, but also in a complicated structure of the link mechanism which may tend to cause malfunction.

Also proposed is a transmission remote control assembly whose link mechanism does not pass the vicinity of the center of inclining movement of the cab body. However, the link mechanism of such a known remote control assembly should have at least a couple of links so constructed that they can be elongated and contracted away from and toward each other. The reason for this is that the change lever is removed from the transmission when the cab body is caused to undergo inclining movement. Furthermore, even with this control assembly, a part of the link mechanism is raised above or to the side of the engine room and therefore, inspection and repair of an engine are hindered to a great extent.

SUMMARY OF THE INVENTION

It is a primary object of the present invention to provide a transmission remote control assembly which eliminates the above-discussed drawbacks of the prior art.

Another object of the present invention is to provide a simple and compact transmission remote control assembly having as few problems as possible and having a reduced weight.

A further object of the present invention is to provide a transmission remote control assembly which has no linkage passing around the engine so that the engine may readily be inspected without obstacles when desired.

A still further object of the present invention is to provide a transmission remote control assembly in which the distance between the point where force is applied to the change lever and the point where force acts on the transmission is reduced whereby the force transmission efficiency is enhanced.

A still object of the present invention is to provide a transmission remote control assembly free of any linkage that may be disengaged and elongated at the time when the cab body is allowed to undergo inclining movement.

A still further object of the present invention is to provide a transmission remote control assembly wherein any linkages which have been disengaged upon inclining movement of the cab body can be smoothly brought into connecting engagement as the cab body returns to its horizontal stationary state.

A still further object of the present invention is to provide a transmission remote control assembly wherein a first link mechanism connected to the change lever and carried by the cab body and a second link mechanism connected to the transmission lever or levers and supported by the frame assembly may be arbitrarily engaged or disengated by connecting means.

A still further object of the present invention is to provide a transmission remote control assembly having a means for locking the first link mechanism whereby the movement of the first link mechanism may be locked when the cab body undergoes inclining movement.

The above-mentioned objects have been achieved in accordance with the present invention by a transmission remote control assembly of a tilt-cab type vehicle in which a cab body is pivotably supported at the front end of a frame assembly by means of a tilt hinge, the control assembly comprising a change lever means carried by the cab body, a first link mechanism connected to the change lever means, a transmission lever means of a transmission mounted on the frame assembly, a second link mechanism connected to the transmission lever means and at least one connecting means comprising a pair of connecting members which are brought into connecting engagement when the cab body lies in the horizontal stationary state, but are disengaged from each other when the cab body is allowed to undergo inclining movement, the pair of connecting members being respectively connected to the first and second link mechanisms, whereby when the pair of connecting members are brought into connecting engagement, the change lever means and the transmission lever means may co-operate via the connected first and second link mechanisms, whereas when the pair of connecting members are disengaged from each other, the first and second link mechanisms are disconnected so that the cab body may undergo inclining movement.

Preferably, the remote control assembly in accordance with this invention further comprises a lock means for substantially locking the first link mechanism to the cab body when the cab body is allowed to undergo inclining movement and releasing the locking of the lock means when the cab body lies in the horizontal stationary state.

The invention will be further described with reference to the accompanying drawings.

DESCRIPTION OF PREFERRED EMBODIMENTS

An example wherein the present invention has been applied to a so-called "two rod" transmission remote control assembly in which change lever operations for shifting and selection are carried out in separate systems for enhancing the stability of operation is now described with reference to the accompanying drawings.

Figure 2A:
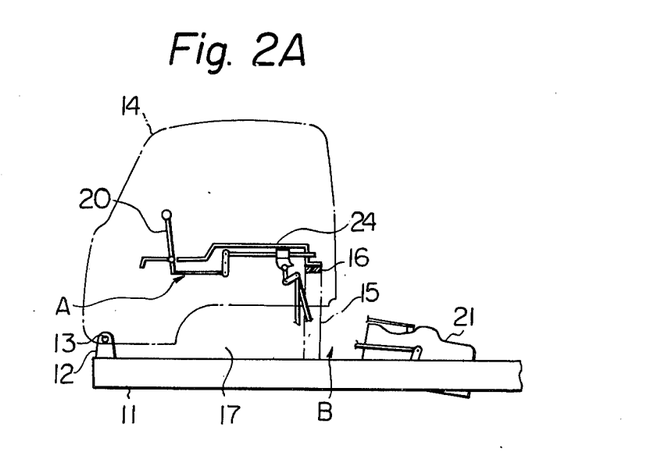
FIGS. 2A and 2B are schematic side views for illustrating the function of a transmission remote control assembly in accordance with the invention, and respectively shows a state in which the cab body lies in a horizontal stationary position and a state in which the cab body has undergone inclining movement around the tilt hinge.
Figure 2B:
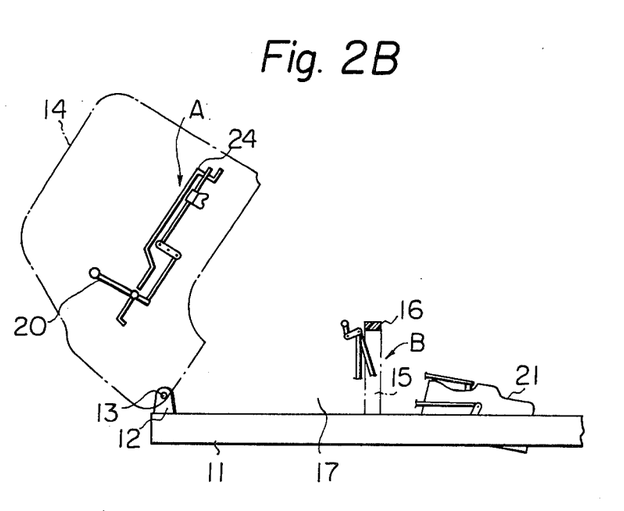

In a tilt-cab type vehicles, as shown in FIG. 2A, a frame assembly 11 has on both sides of its front end portion a pair of hinge brackets 12 fixed thereto carrying a tilt hinge 13. A cab body 14 is rotatably mounted with its front lower portion supported by the tilt hinge 13. In the normal stationary state, in which the cab body 14 lies horizontally, the rear lower surface of the cab body 14 rests upon the upper surface of a cab mounting bracket 15, which is rigidly connected to the frame assembly 11 at its both end portions, via a shock absorbing member 16. When the engine or attachments and parts thereof are to be inspected, the cab body 14 may be caused to rotate counter clock-wise around the tilt hinge 13, as shown in FIG. 2B, for example, by tortion bars not shown, so as to open an engine room 17. Such a construction described above is already known.

A transmission remote control assembly in accordance with the invention comprises a first link mechanism A connected to a change lever 20 disposed in the cab body 14, a second link mechanism B connected to a transmission 21, a connecting means C for arbitrarily engaging and disengaging both mechanisms A and B to and from each other and a means D for locking the first link mechanism A.

Figure 1:
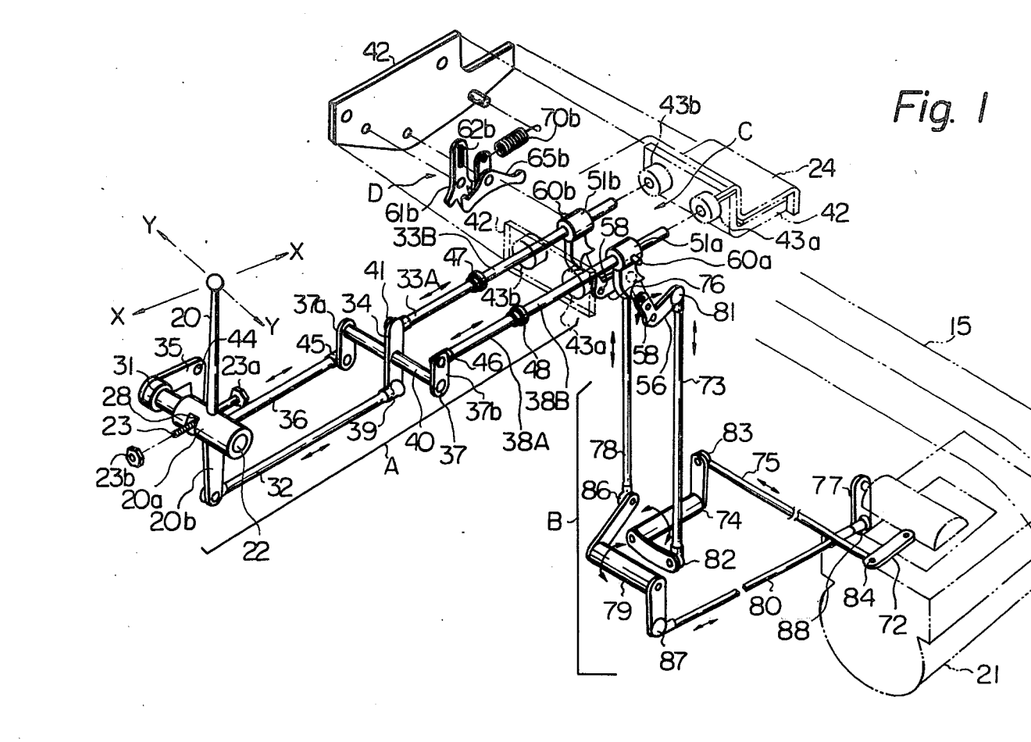
FIG. 1 is a perspective view for showing a schematic system of a transmission remote control assembly in accordance with the invention.
Figure 3:
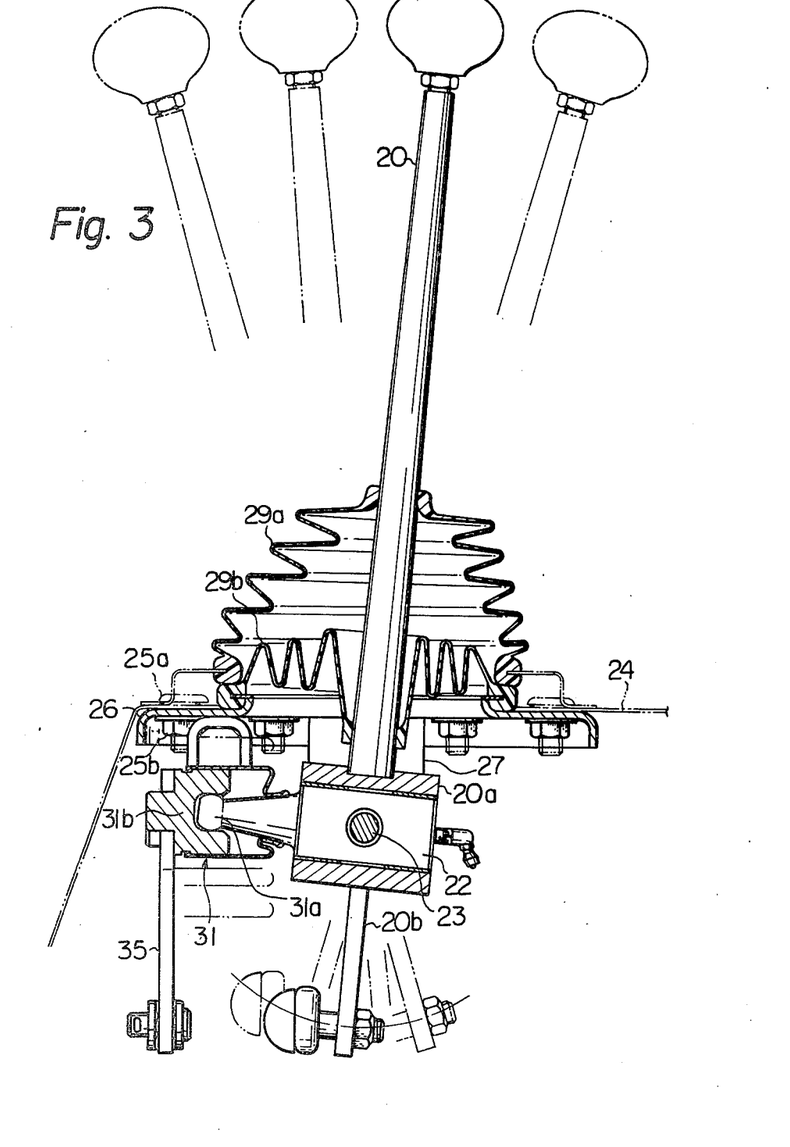
FIG. 3 is a vertically cross-sectional front view showing one embodiment of a change lever means in a transmission remote control assembly in accordance with the invention.
Figure 4A:
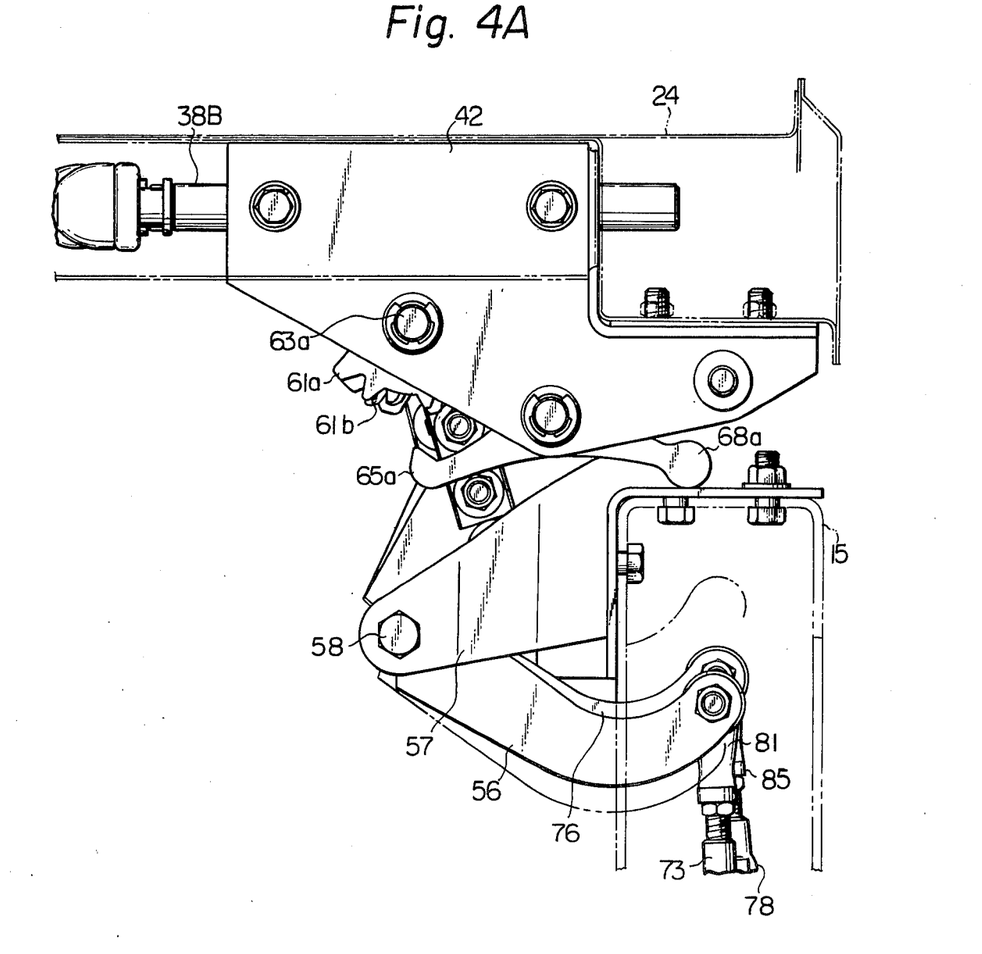
FIGS. 4A and 4B are respectively side and bottom views showing one embodiment of a connecting means having a pair of connecting elements in a transmission remote control assembly in accordance with the invention.
Figure 4B:
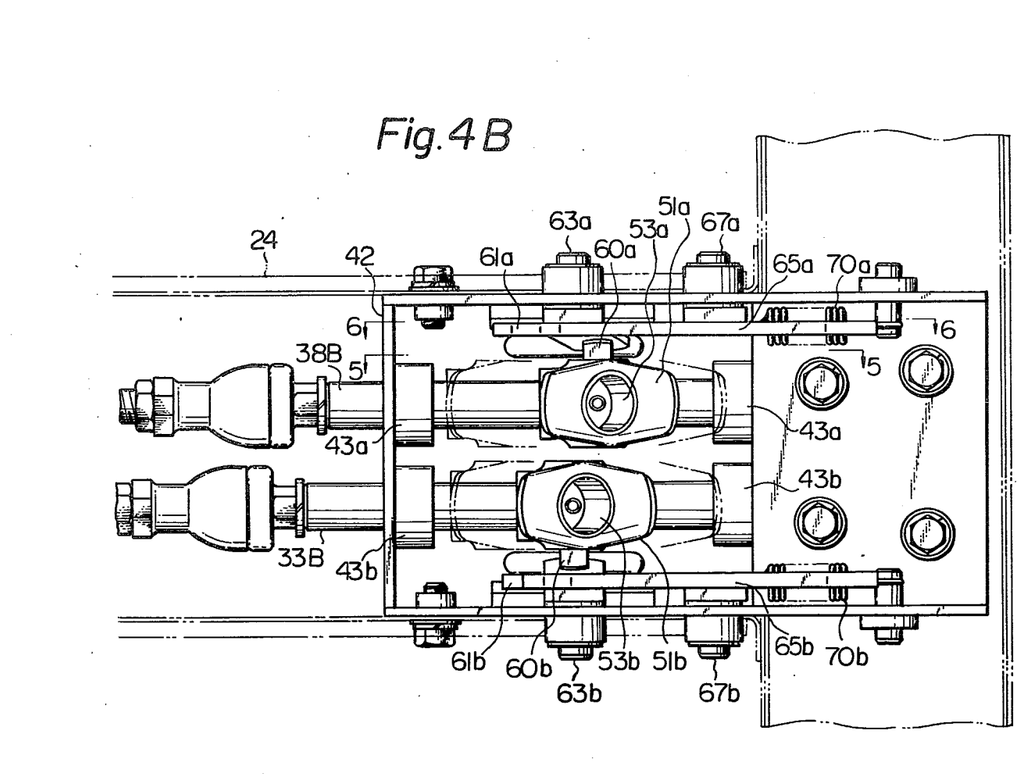
Figure 5:
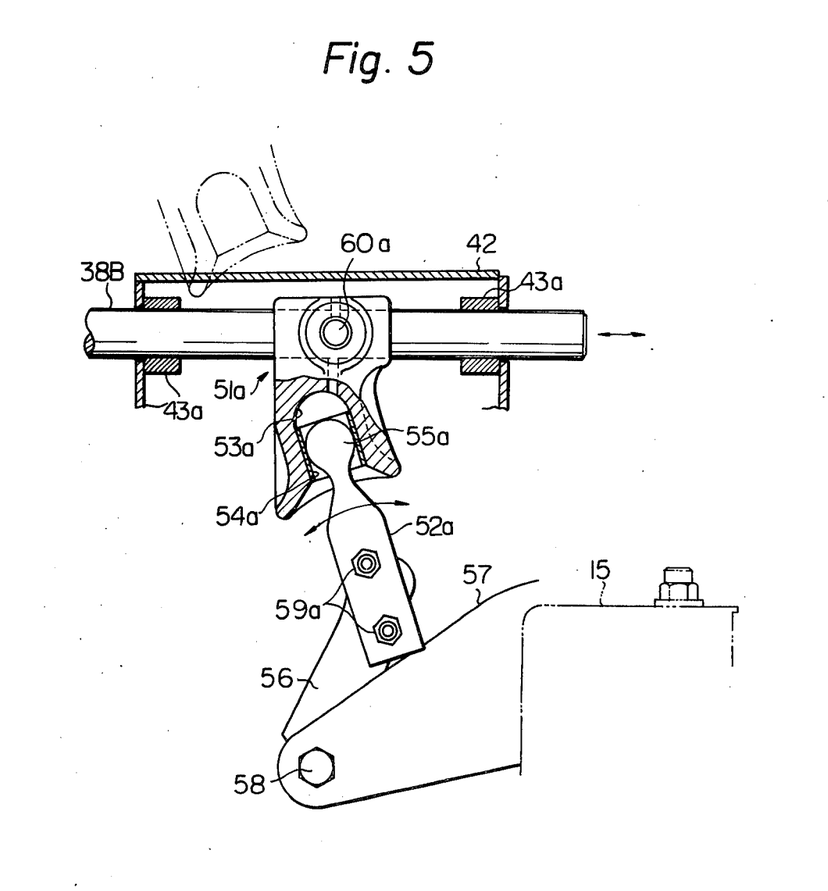
FIG. 5 is a partly cut away side view for illustrating the connection between the first link mechanism for selection and the second link mechanism for selection in a transmission remote control assembly in accordance with the invention, and is also a cross-sectional view taken along line 5—5 in FIG. 4B in which cross-sectional views of the first and second link mechanism for shifting are omitted.

As shown in FIGS. 1 and 3, the change lever 20 comprises an intermediate tubular portion 20a, which is rotatable around a support pin 22 extending laterally and permits the change lever 20 inclining movement to move forward or backward, that is, in the direction shown by X—X for the purpose of shifting. The support pin 22 is rotatably supported at its axis center by a center pin 23 perpendicularly penetrating the support pin 22 and the tubular portion 20a of the lever 20, permitting a lateral inclining movement of the lever 20 in the direction shown by Y—Y for the purpose of selection. The center pin 23 comprises a bolt 23a and a nut 23b, and is securely fixed to a cab floor 24 by inserting the bolt 23a through a pair of brackets 27 downwardly extending from a support 26, which is fixed to the lower surface of the cab floor 24 by means of bolt 25a and nut 25b and then tightening the bolt 23a with the nut 23b. The tubular portion 20a of the change lever 20 is provided with slits 28 peripherally extending on its opposing sides where the center pin 23 penetrates therethrough whereby the change lever 20 may make an inclining movement in the X—X direction so that the lower end 20b of the lever 20 may transmit a shift operation. Upper boot 29a and lower boot 29b, which cover a hole opened at a part of the cab floor 24 and penetrate, the change lever 20 respectively, prevent soil, dust and the like in the cab body from entering the engine room 17. The support pin 22 has a ball 31a at one of its ends, which constitutes a part of a ball joint 31. The ball 31a transmits a select operation of the change lever 20 to a first select link mechanism which will be herein after described.

The first link mechanism A is connected to the above-disclosed change lever means. The first link mechanism A comprises a mechanism for shifting and a mechanism for selecting. The mechanism for shifting comprises rods 32, 33A and 33B and a lever 34, while the mechanism for selection comprises a bell crank 35, a rod 36, a crank lever 37 and rods 38A and 38B.

The front end of the rod 32 is pivotally connected to the lower end 20b of the change lever 20 and the rear end of the rod 32 is universally connected to one end of the lever 34 by means of a ball joint 39. A shaft 40 of the crank lever 37 of the mechanism for selection is substantially rotatably supported by the cab floor 24 and levers 37a and 37b at both ends thereof. The lever 34 of the mechanism for shifting is supported at the center by the shaft 40 so that it may rotate around the shaft 40. The front end of the rod 33A is universally connected to the other end of the lever 34 by means of a ball joint 41, while the rear end of the rod 33A is articulately connected to the front end of the rod 33B. The rear end of the rod 33B is allowed to pass through and longitudinally slidably supported by two rod guides 43b formed in the cab floor 24 and in a bracket case 42 fixed on a lower face of the cab floor 24.

The bell crank 35 of the mechanism for selection is rotatably supported by the cab floor 24 by means of a pin 44. A ball bearing 31b provided at the front end of the bell crank 35 constitutes together with the ball 31a of the support pin 22 a ball joint 31. The other end of the bell crank 35 is pivotably connected to the front end of the rod 36. The lever 37a is universally connected to the rear end of the rod 36 by means of a ball joint 45, while the lever 37b is universally connected to the front end of the rod 38A. The rear end of the rod 38A is articulately connected to the front end of the rod 38B, while the rear end of the rod 38B is allowed to pass through and slidably supported by rod guides 43a respectively formed in the cab floor 24 and in the bracket case 42.

The first link mechanism A may be connected to the second link mechanism B by the connecting means C. This will be explained in detail with reference to FIGS. 1 and 4A through 7. The explanation for the connecting means C and the means D for locking the first link mechanism will be focussed upon the mechanism for selection. The same explanation will be applicable to the mechanism for shifting by replacing each reference numeral having a suffix a used in the explanation of the mechanism for selection with the same reference numerical having a suffix b.

A coupler 51a is rigidly fixed to and surrounds the rod 38B at the upper portion thereof. The coupler 51a hangs from the rod 38B and opens at the lower portion thereof in the shape of a bell mouth to form a coupling recess 53a. A cylindrical bush 54a is held against and by the inner wall of the recess 53a. On the other hand, a bell crank 56, which forms the front end of a mechanism for selection in the second link mechanism B which will be described hereinafter, is rotatably supported by means of a pin 58 at the end of a bracket 57, which projects from the upper end of the cab mounting bracket 15. A finger 52a fixed to one end of the bell crank 56 by means of bolts and nuts 59a has at its top end a ball 55a which fits into the coupling recess 53a in the stationary state in which the cab body 14 lies horizontally. When the cab body 14 is caused to rotate counter clockwise around the tilt hinge in FIGS. 2A and 2B, the coupler 51a disengages from the finger 52a and ascends upwardly. Where the coupler 51a and finger 52a are engaging, an axial movement of the rod 38B causes the coupler 51a to longitudinally move and the ball joint mechanism between the coupler 51a and finger 52a allows the finger 52a together with the bell crank 56 to rotate around the pin 58 so that the second link mechanism operates.

Figure 6:
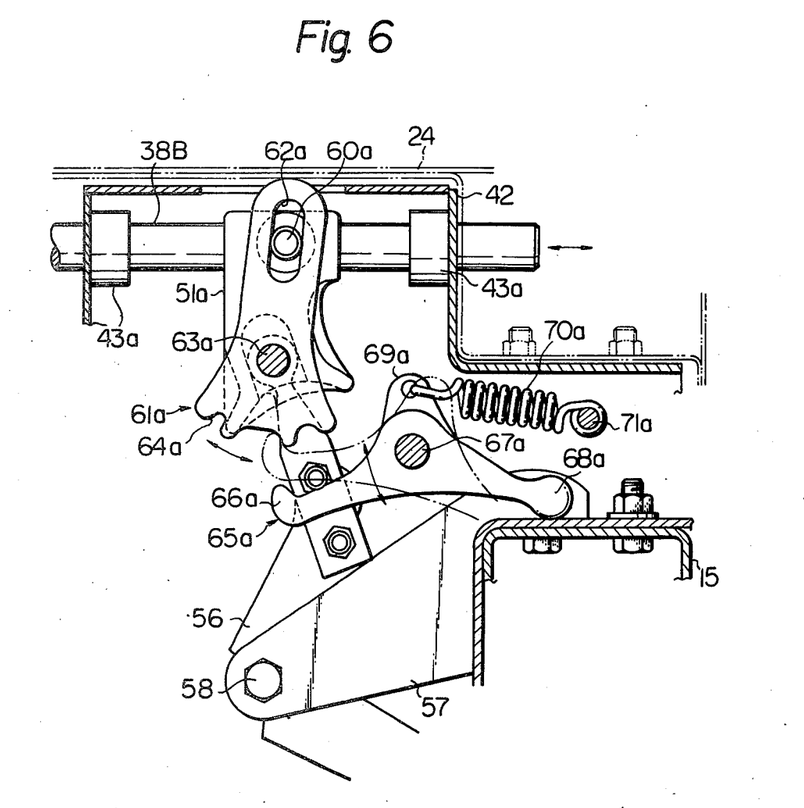
FIG. 6 is a partially cross-sectional view for illustrating a means for locking the first link mechanism for selection in a transmission remote control assembly in accordance with the invention, and is also a cross-sectional view taken along line 6—6 in FIG. 4B in which views of the mechanisms for shifting are omitted.
Figure 7:
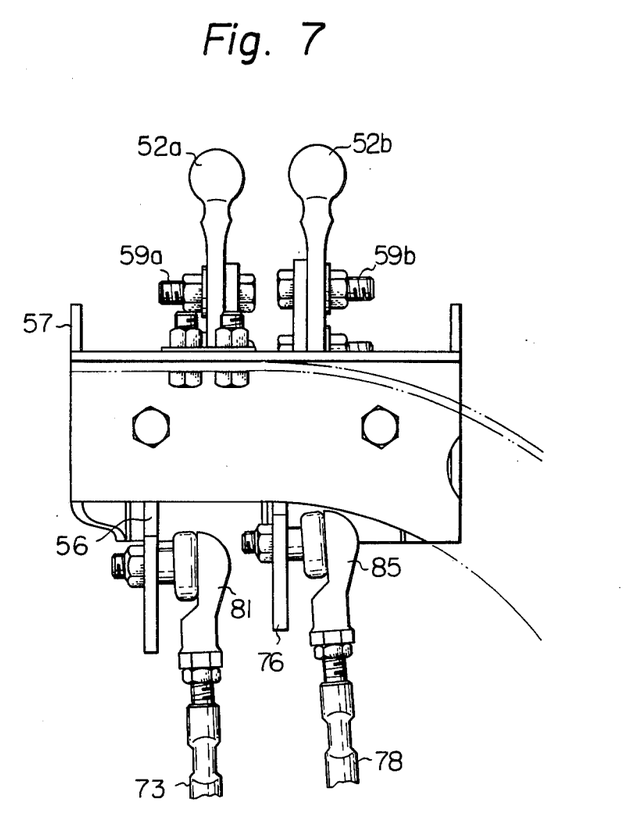
FIG. 7 is a back view showing a part of the connecting means and a part of the second link mechanism.

Referring to FIG. 6, the coupler 51a has a laterally outwardly protruding pin 60a, which is inserted into a slit 62a formed in the upper part of a lock lever 61a so that the pin 60a is slidable along the slit 62a. The lower part of the lock lever 61a is rotatably supported by a pin 63a inwardly extending from a side wall of the bracket case 42 and has an arched and toothed lower face 64a. A lock arm 65a is rotatably supported a the center thereof by a pin 67a inwardly extending from the side wall of the bracket case 42. The arm 65a has a claw 66a capable of engaging with the toothed face 64a and also has a releasing arm 68a extending in a direction opposite the claw 66a and an upwardly extending arm 69a. A coil spring 70a, which is disposed with one end fixed to a hole formed on the top end of the arm 69a and the other end fixed to an inwardly extending pin 71a from the side wall of the bracket case 42, always urges, by its resilient action, the lock arm 65a around the pin 67a so that the claw 66a is capable of engaging with the toothed face 64a and the movement of the rod 38B can be locked. When the cab body 14 is brought about in its horizontal stationary position, the releasing arm 68a is allowed to abut the upper surface of the cab mounting bracket 15 and causes the lock arm 65 to rotate around the pin 67a against the resilient force of the spring 70a whereby the claw 66a may be disengaged from the toothed face 64a of the lock lever 61a. As a result, the lock lever 61a is swingable around the pin 63a by means of movement of the pin 60a as the coupler 51a moves in accordance with the axial movement of the rod 38B. It will be understood that the axial movement of the rod 38B determines the angle of rotation of the lock lever 61a and the locking of the lock lever 61a by the lock arm 65a also locks the axial movement of the rod 38B.

Thus, the connecting means C comprises couplers 51a and 51b and fingers 52a and 52b, while the locking means D comprises lock levers 61a and 61b, lock arms 65a and 65b, and springs 70a and 70b.

The second link mechanism B also comprises a mechanism for shifting and a mechanism for slecting. The mechanism for selection for linking the bell crank 56 to a select lever 72 of the transmission comprises a rod 73, a crank lever 74 and a rod 75, while the mechanism for shifting for linking a bell crank 76 fixed to the finger 52b for shifting to a shift lever 77 of the transmission comprises a rod 78, a crank lever 79 and a rod 80.

The rod 73 vertically extends with its upper end universally connected via a ball joint 81 to an end of the bell crank 56 and with its lower end universally connected via a ball joint 82 to one end of the crank lever 74. The rod 75 laterally extends with one end universally connected via a ball joint 83 to the other end of the crank lever 74 while the other end of the rod 75 is universally connected via a ball joint 84 to the select lever 72.

Likewise, the rod 78 for shifting is universally connected to an end of the bell crank 76 and to one end of the crank lever 79 via ball joints 85 and 86, respectively, while the rod 80 is universally connected to the other end of the crank lever 79 and to the shift lever 77 via ball joints 87 and 88, respectively.

Crank shafts of the crank levers 74 and 79 may be rotatably mounted on any part of the frame assembly, engine, clutch and transmission.

The operation of the transmission remote control assembly proposed herein will now be described. When the cab body lies in its horizontal stationary state as shown in FIG. 2A, the coupler 51a and finger 52a for selection as well as the coupler 51b and finger 52b for shifting are respectively engaging. FIGS. 1, 4A, 4B, 5 and 6 also represent such a state. In this state, when the change lever 20 is caused to move laterally, i.e. in the direction shown by Y—Y in FIG. 1, for the purpose of selection, the support pin 22 is allowed to rotate around the center pin 23 so that the bell crank 35 rotates around the pin 44. The bell crank 35 causes the rod 36 to move longitudinally and the crank lever 37 is permitted to rotate with the shaft 40 as the center of rotation so that the rods 38A and 38B are caused to move longitudinally. As the lever 37 rotates, the front end of the rod 38A may undergo a slight vertical movement, but, however, the ball joint 48 serves to prevent such vertical movement from being transmitted to the rod 38B. The longitudinal movement of the rod 38B causes the coupler 51a, to move longitudinally and in turn, via the ball 55a engaging with the coupler 51a, causes the finger 52a to swing around the pin 58. This swinging movement of the finger 52a causes the rod 73 to move vertically, the crank lever 74 to swing around its shaft and the rod 75 to move axially, whereby the select lever 72 is allowed to operate. Rotation of the select lever 72 permits selection of gears to be engaged for transmission of engine power.

The change lever 20 is then caused to move forward or backward, i.e. in the direction shown by X—X in FIG. 1, for the purpose of shifting, whereupon the tubular portion 20a rotates around the support pin 22 and the lower end portion 20b of the lever 20 swings. The lower end portion 20b of the lever 20 causes the rod 32 to axially move and the crank lever 34 is permitted to rotate around the shaft 40 so that the rods 33A and 33B are caused to move longitudinally. The longitudinal movement of the rod 33B causes the coupler 51b to move longitudinally and causes the finger 52b to swing around the pin 58. This swinging movement of the finger 52b causes the rod 78 to move vertically, the crank lever 79 to swing around its shaft and the rod 80 to move axially, whereby the shift lever 77 is allowed to operate. Rotation of the shift lever 77 permits engagement of the selected gears so that engine torque may be transmitted to wheels with optimum gear ratio.

When the cab body 14 has been caused to undergo inclining movement, for example, for the purpose of inspection or repair of engines, as shown in FIG. 2B, the connecting means C, comprising a pair of connecting members, that is, a coupler 51a and finger 52a for selection and another pair of connecting members, that is, a coupler 51b and finger 52b for shifting, is brought into disengagement, since the couplers 51a and 51b are caused to ascend together with the cab body 14. As a result, the first link mechanism A carried by the cab body 14 is disconnected from the second link mechanism B carried by the frame assembly 11. Only the second link mechanism B remains on the frame assembly 11 in the vicinity of or behind the cab mounting bracket 15, rendering the engine room 17 readily accessible for inspection and/or repair of the engine.

As the cab body 14 starts to incline, the release arms 68a, and 68b of the lock levers 61a and 61b in the lock mechanism D are allowed to depart from the cab mounting 15. For example, as seen from FIG. 6, the resilient force of the coil spring 70a causes the lock arm 65a to rotate clockwise around the pin 67a and the claw 66a is brought into engagement with the toothed face 64a of the lock lever 61a thereby locking the lock lever 61a and in turn, the first mechanism for selection including the rod 38B. The lock lever 61b and lock arm 65b for shifting operate similarly.

Such locking by the lock means D has the following technical significances. In the stationary state in which the cab body 14 lies horizontally, the operation of the change lever 20 for selection and shifting displaces, via the first link mechanism for selection and shifting, the couplers 51a and 51b as well as the fingers 52a and 52b. At the same time, via the pins 60a and 60b, the lock levers 61a and 61b are caused to rotate around the pins 63a and 63b, respectively. The lock means locks the lock levers 61a and 61b with the angles of rotation in accordance with the extent of the operation of the change lever 20 whereby it may lock the positions of the couplers 51a and 51b at that time and in turn, the state of the change lever 20 as well as the state of the first link mechanism A. Accordingly, the change lever 20 and the first link mechanism A can, even during and after inclining movement of the cab body, maintain the same states as they possessed immediately prior to the inclinng movement of the cab body. As a result, when the cab body 14 is allowed to return to its horizontal stationary state, the couplers 51a and 51b, carried by the cab body, can be smoothly brought into connecting engagement with the respective fingers 52a and 52b carried by the frame assembly 11, without failure. The bell mouth-shaped lower end of the coupler serves to guide the finger balls 55a and 55b into the respective coupling recesses 53a and 53b thereby to assist both members to be brought into the desired engagement. When the cab body 14 has returned to its horizontal state, as shown in FIG. 2A, the releasing arms 68a and 68b of the lock arms 65a and 65b abut against the upper surface of the cab mounting 15, and are caused to rise against the resilient force of the coil springs 70a and 70b, whereupon the claws 66a and 66b are disengaged from the toothed faces 64a and 64b so that the locking may be released, making the change lever 20 operable.

In the illustrated assembly, it is not necessary to locate the center of movement of the link mechanism in the vicinity of the center of inclining movement of the cab body and thus, any link mechanisms may be located behind the change lever 20. Accordingly, the distance between the point where force is applied and the point where force acts may be reduced whereby the force transmission efficiency may be enhanced. Furthermore, any links that extend forward from the change lever 20 to the vicinity of the center of inclining movement of the cab body 14, may be omitted in the illustrated assembly. This fact simplifies the structure of the assembly and reduces the frequency of malfunction. Still further, the working space for the change lever may be set relatively broad and the length of individual links may be relatively short whereby the assembly may be made more rigid and less heavy.

While the illustrated embodiment relates to a so-called "two rod" transmission remote control assembly, in which change lever operations for shifting and selection are carried out in separate systems, it should be appreciated that the invention is also applicable to a "one rod" assembly in which change lever operations are transmitted to the vicinity of the transmission 21 by one rod. Various changes and modifications of the parts, including the connecting means, lock means and link mechanisms, will be possible within the scope of the appended claims without departing from the spirit of the invention.

What is claimed is:

1. In a transmission control assembly of a tilt-cab type vehicle, in which a cab body is pivotably supported at the front end of a frame assembly by means of a tilt hinge, said control assembly comprising a change lever means carried by the cab body, a first link mechanism connected to said change lever means, a transmission lever means of a transmission mounted on the frame assembly, a second link mechanism connected to said transmission lever means, and at least one connecting means comprising a pair of connecting members, which are brought into connecting engagement when the cab body lies in the horizontal stationary state, but are disengaged from each other when the cab body is allowed to undergo inclining movement, said pair of connecting members being respectively connected to said first and second link mechanisms, whereby when said pair of connecting members are brought into connecting engagement, said change lever means and said transmission lever means may cooperate via the connected first and second link mechanisms, whereas when said pair of connecting members are disengaged from each other, said first and second link mechanisms are disconnected so that the cab body may undergo inclining movement the improvement comprising said transmission lever means having a shift lever and a select lever; said first link mechanism including a mechanism for shifting which is connected to said change lever means to transmit the shifting operation of said change lever means, and a mechanism for selection which is connected to said change lever means so as to transmit the selecting operation of said change lever means; said second link mechanism includes a mechanism for shifting which is connected to said shift lever and a mechanism for selecting which is connected to said select lever; and said connecting means has a pair of connecting members for shifting, for engaging, and for disengaging said mechanisms for shifting of said first and second link mechanisms, and another pair of connecting members for engaging and disengaging said mechanisms for selection of said first and second link mechanisms.

2. A transmission remote control assembly in accordance with claim 1 wherein one of said connecting members connected to said second link mechanism is disposed in the vicinity of a cab mounting bracket for supporting the rear end of the cab body positioned behind said tilt hinge.

3. A transmission remote control assembly in accordance with claim 1, wherein each of said mechanisms for shifting and mechanisms for selecting in said first link mechanism comprises a link as its most backward member which is slidably supported by the cab body and by a bracket fixed to the cab body, said link being capable of being displaced longitudinally; one member of said pair of connecting members for shifting and one member of said other pair of connecting members for selecting are respectively and correspondingly fixed to said links; the other member of said pair of connecting members for shifting is connected to said mechanism for shifting in said second link mechanism; the other member of said other pair of connecting members for selection is connected to said mechanism for selection in said second link mechanism, and; each of said other members is swingably supported by a bracket fixed to a cab mounting bracket for supporting the rear end of the cab body.

4. A transmission remote control assembly in accordance with claim 3, wherein each said one member is a ball journal with an upper portion rigidly fixed to and surrounding each of said links and with a generally bell mouth-shaped lower portion, while each said other member is fixed to a bell crank and has at the upper end thereof a ball capable of being brought into engagement with said ball journal, said bell crank constituting a front end of said mechanism for shifting or selection in said second link mechanism and slidably supported by said bracket fixed to said cab mounting.

5. A transmission remote control assembly of a tilt-cab type vihcle in which a cab body is pivotably supported at the front end of a frame assembly by means of a tilt hinge, said control assembly comprising a change lever means carried by the cab body, a first link mechanism connected to said change lever means, a transmission lever means of a transmission mounted on said frame assembly, a second link mechanism connected to said transmission lever means, at least one connecting means comprising a pair of connecting members, which are brought into connecting engagement when the cab body lies in the horizontal stationary state, but are disengaged from each other when the cab body is allowed to undergo inclining movement, and a lock means for substantially locking said first link mechanism to the cab body when the cab body is allowed to undergo inclining movement and releasing said lock when the cab body lies in the horizontal stationary state, whereby when said pair of connecting members are brought into connecting engagement, said change lever means and said transmission lever means co-operate via the connected first and second link mechanisms whereas when said pair of connecting members are disengaged from each other, said first and second link mechanisms are disengaged so that the cab body may undergo inclining movement and at the same time, said first link mechanism is locked to the cab body.

6. A transmission remote control assembly in accordance with claim 5, wherein said lock means comprises a lock lever co-operating with said first link mechanism and a lock arm which is engaged with said lock lever when the cab body is allowed to undergo inclining movement, but is disengaged from said lock lever when the cab body lies in the horizontal stationary state.

7. A transmission remote control assembly in accordance with claim 6, wherein said lock lever is provided with a slit and a toothed face and is capable of substantially rotating around a pin fixed to the cab body, said slit being engaged with a pin mounted on the connecting member fixed to said first link mechanism; and said lock arm is always urged by a spring force so as to be engaged with said toothed face and when the cab body lies in the horizontal stationary state, abuts the cab mounting and rotates against said spring force around a fixed pin so as to release the lock.

* * * * *